United States Patent [19]

Watanabe

[11] 4,150,832
[45] Apr. 24, 1979

[54] MECHANISM FOR CAUSING RETURNING MOVEMENT OF TONE ARM OF TOY PHONOGRAPH

[75] Inventor: Katsumi Watanabe, Kawasaki, Japan

[73] Assignee: Yugen Kaisha Watanabe Kenkyusho, Kawasaki, Japan

[21] Appl. No.: 847,849

[22] Filed: Nov. 2, 1977

[30] Foreign Application Priority Data

Jun. 13, 1977 [JP] Japan .................................. 52-69742

[51] Int. Cl.$^2$ .......................................... G11B 17/06
[52] U.S. Cl. ................................... 274/15 R; 274/1 A
[58] Field of Search ............. 274/1 A, 1 L, 9 R, 15 R

[56] References Cited

U.S. PATENT DOCUMENTS

| 1,393,229 | 10/1921 | McDonald | 274/15 R |
| 3,589,735 | 6/1971 | Watanabe | 274/15 R |

Primary Examiner—Richard E. Aegerter
Assistant Examiner—John W. Shepperd
Attorney, Agent, or Firm—Irving M. Weiner; Pamela S. Austin; Melvin Yedlin

[57] ABSTRACT

A mechanism for automatically returning a tone arm of a toy phonograph from the final to the starting positions of a reproduction. A swingable rod is provided for lifting an intermediate sound transmitting body which usually depresses the tone arm, when the tone arm has been brought to the final position of the reproduction, so as to allow the reproducing needle carried by the tone arm to be disengaged from the recording groove, thereby enabling the tone arm to return. The upward movement of the swingable rod is initiated by an engagement of the rod with a cam contour formed on the drive shaft for the record disc. In order that the swingable rod may correctly ride on the cam contour, so as to be lifted by the latter to make the tone arm free from the depressing force of the intermediate sound transmitting body, there is provided a buffer resilient body adapted to absorb the movement of the swingable rod and the movement of the tone arm which presses the rod toward the cam. By the absroption of these movements, the tone arm is allowed to swing, even after the swingable rod has collided with the higher side of the cam contour, so as to make the swingable rod stationary until the lower side of the cam contour, on which the swingable rod is destined to ride, is brought to confront the swingable rod.

3 Claims, 6 Drawing Figures

MECHANISM FOR CAUSING RETURNING MOVEMENT OF TONE ARM OF TOY PHONOGRAPH

BACKGROUND OF THE INVENTION

1. Field of the Invention

The present invention provides a mechanism for initiating or causing a returning movement of a tone arm of a toy phonograph which is used as a toy operated directly by the user or incorporated in a doll or in a "laughter bag" or the like.

More particularly, the present invention relates to a mechanism for causing a returning movement of a toy phonograph which is improved to afford a smooth returning of the tone arm, after a play back of the record disc, from the final to the starting positions of the reproduction, through avoiding a collision of the tone arm with the side surface of a cam for causing the upward movement of the tone arm to make the reproducing needle carried by the tone arm free from the recording groove.

2. Description of Prior Art

Some types of conventional toy phonographs incorporate a tone arm pivotally mounted and normally biased toward the starting position of the reproduction, and depressed by an intermediate sound transmitting body contacting the speaker, so as to put the reproducing needle into engagement with the recording groove formed in the surface of the record disc. The needle then slides along the recording groove, keeping a sound-transmitting contact with the sound transmitting body, so as to transmit the reproducing vibration to the speaker.

In the toy phonograph of the kind described, the automatic returning motion of the tone arm is performed by the following mechanism. As the tone arm is brought to the final position of the reproduction, a separately pivoted swingable rod is pressed by the tone arm toward the center of rotation of the record disc, so as to force the rod to ride on a cam which is provided on the upper end of the record disc driving shaft and adapted to exert an upward force on the swingable rod. As the swingable rod is lifted by the cam, the swingable rod in turn lifts the intermediate sound transmitting body to relieve the tone arm from the latter, so as to allow the reproducing needle to be disengaged from the recording groove, thereby enabling the tone arm to be freely returned by the biasing force to the starting position of the reproduction.

In such mechanism, it is necessary to position a lead groove following the final portion of the recording groove in correct alignment with the lower side of the cam contour on which the swingable rod is destined to ride, in order that the lower side of the cam may correctly confront the swingable rod when the tone arm has been brought to the final position of the reproduction, for a smooth riding of the rod on the cam contour.

Were it not for this careful setting, the swingable rod could be pressed onto the higher side of the cam on which the swingable rod cannot ride. Then, the swingable rod would have to be kept stationary, in contact with the side of the cam, until the cam is rotated to bring its lower side in alignment with the swingable rod to allow the riding of the swingable rod on the cam. During this waiting period, the reproducing needle is inevitably forced out from the lead groove, resulting in damage to the record disc, as well as to the reproducing needle.

Therefore, in a phonograph in which the record disc is demountable and interchangeable, a notch or projection is formed in the brim of the central bore of the record disc, for engagement with a mating projection or notch formed on the cam, so as to ensure the correct location of the disc relative to the cam. However, it is not easy nor convenient for an infant, who is the major user of the toy, to align the small projection and notch on the driving mechanism with each other.

Also, in a phonograph having a sole fixed record disc, the production process is inconveniently complicated due to the necessity of in-phase alignment of the cam and the lead groove.

SUMMARY OF THE INVENTION

The present invention is provided to overcome the above described problems of conventional toy phonographs.

It is therefore an object of the invention to provide a toy phonograph of automatic tone arm returning type, in which the record disc can be placed simply without necessitating the in-phase alignment of the lead groove with the cam.

It is another object of the invention to provide a mechanism for automatically returning the tone arm, the mechanism having a simple structure.

It is still another object of the invention to facilitate the mounting of the record disc in the manufacturing process, so as to facilitate the manufacture.

It is a further object of the invention to avoid damaging of the record disc and reproducing needle.

It is a still further object of the invention to provide a construction of toy phonograph which can be easily handled and operated even by an infant.

To these ends, according to the invention, there is provided a mechanism for causing returning movement of the tone arm characterized by comprising a buffer resilient member adapted to resiliently press the swingable rod to the side of a cam formed at the upper end of the record disc driving shaft coaxially with the latter, in relation with the movements of the tone arm and the swingable rod, when the tone arm has been brought to a position close to the final position of the reproduction, the buffer resilient body being provided on at least the front side of the cam.

Due to the provision of this buffer resilient member, the swingable rod is resiliently pressed onto the side of the cam when the tone arm has been brought to the position close to the final position of the reproduction, so that the swingable rod is kept stationary in contact with the side of the cam until the lower side of the cam is brought into alignment with the swingable rod, while allowing the further swinging movement of the tone arm along the lead groove.

In another embodiment of the invention, the buffer resilient body is constituted by a rod-shaped spring or a leaf spring provided on the side of the swingable rod facing the cam side, so that the spring may be regarded as being integral or unitary with the swingable rod. Then, the buffer resilient member is pressed by the tone arm, as a unitary part of the swingable rod, onto the side of the cam, and is kept stationary until the lower side of the cam is brought into alignment with the resilient member, so as to allow the further movements of the tone arm and the swingable rod toward the cam side.

Thus, in the mechanism in accordance with the invention, the swingable rod pressed by the tone arm is kept stationary, after it comes approximately to the cam side, until the cam is rotated to bring the lower side of the cam into alignment with the swingable rod, and as this alignment is fulfilled, the swingable rod is allowed to contact and ride on the cam surface in a resilient manner.

From the above description of the two embodiments, it will be seen that the buffer resilient member should be located on at least the front side of the cam side, for performing the designated function. The term "front side" should be understood to indicate a case in which the buffer resilient member is always kept in slight contact with the cam side.

Alternatively, the buffer resilient member may be constituted by a soft and resilient member provided on either the tone arm or the swingable rod, at the side of the latter facing the other.

As the swingable rod comes to ride on the cam contour, it is gradually lifted higher in accordance with the rotation of the cam, which in turn causes an upward movement of the tone arm. Then, the tone arm is freed from the surface of the record disc, so as to disengage the reproducing needle from the recording groove, and is returned to the starting position of the reproduction due to the biasing force which is normally applied thereto.

Thus, according to the invention, the automatic returning of the tone arm to the starting position is caused by quite simplified means. In addition, the record disc can be set at any desired angular position relative to the cam, without any attendant damaging of the record disc and the needle. Therefore, the toy phonograph incorporating the mechanism of the invention can easily be operated even by an infant, and can be manufactured in a simplified way, because of the elimination of troublesome in-phase alignment of the disc with the cam.

DETAILED DESCRIPTION OF THE PREFERRED EMBODIMENTS

Figure 1:
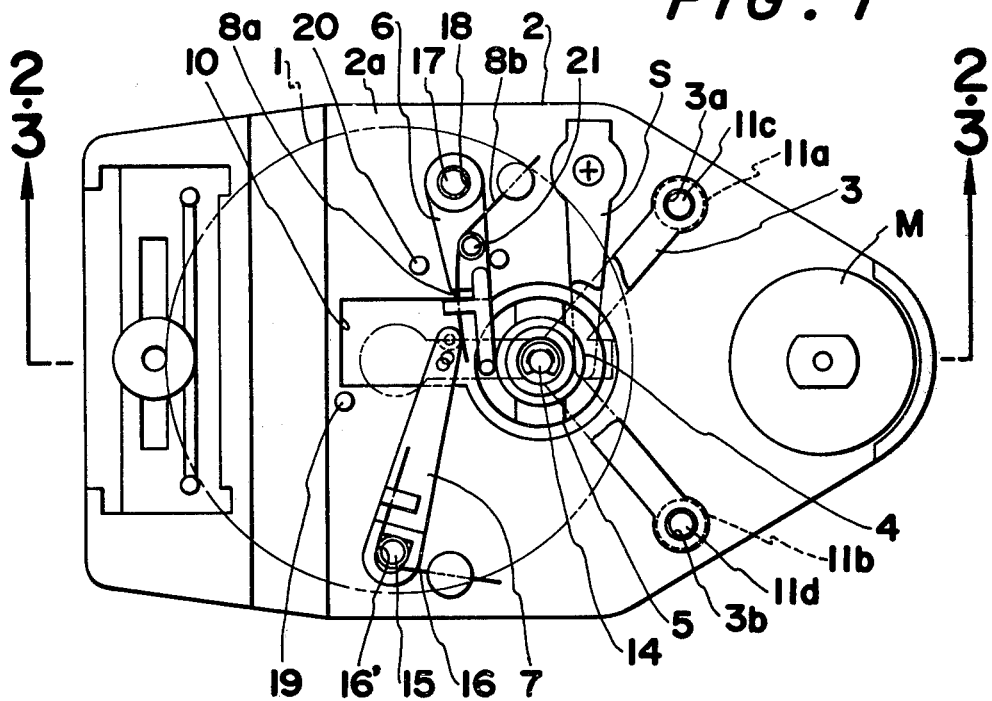
FIG. 1 is a plan view of an embodiment of the invention with its upper cover removed.

Referring first to FIG. 1, a housing 2 is provided with a middle plate 2a extending over its top area. The middle plate 2a has a central opening or window 10 through which a cam 4 is extended upwardly. Also, a reproducing needle 9 (FIG. 2) carried by a tone arm 7 extends donwardly through window 10.

A Y-shaped intermediate sound transmitting body 3 is supported on the mid plate 2a, being cantilevered at the ends of its two arms. Bores 3a, 3b of a relatively large diameter are formed in these ends of the arms, respectively.

Columns or pillars 11a, 11b are provided to extend upwardly from the mid plate 2a, the diameter of which pillars is larger than the bores 3a, 3b of the arms. The pillars 11a, 11b have retainer pins 11c, 11d the diameter of which is so small as to be received by the bores 3a, 3b with a certain clearance or gap. In the assembled state, the arms of the intermediate sound transmitting body 3 are retained by the retainer pins 11c, 11d which are loosely received by the bores 3a, 3b.

Due to the provision of the slight gap between the retainer pins 11c, 11d and the associated bores 3a, 3b, the intermediate sound transmitting body 3 is allowed to move toward and away from the middle plate 2a. A speaker 1 is fixed to the free end of the intermediate sound transmitting body 3, and is directed upwardly. The free portion of the intermediate sound transmitting body 3 is laid over the window 10, and is biased toward a record disc 13 by means of a spring S.

A turntable 12 coaxially carrying the record disc 13 is rotatably mounted under the middle plate 2a. More specifically, the housing 2 has a bottom plate 2b from which extends upwardly a center pin 14. The turntable 12 is rotatably carried by this center pin 14, as will be seen from FIG. 2. The turntable 12 has a driving shaft 5 integrally formed at its center of rotation. The cam 4 having an annular shape is unitarily formed on the upper face of the driving shaft 5, so as to exert a force in the axial direction of the driving shaft 5.

Figure 2:
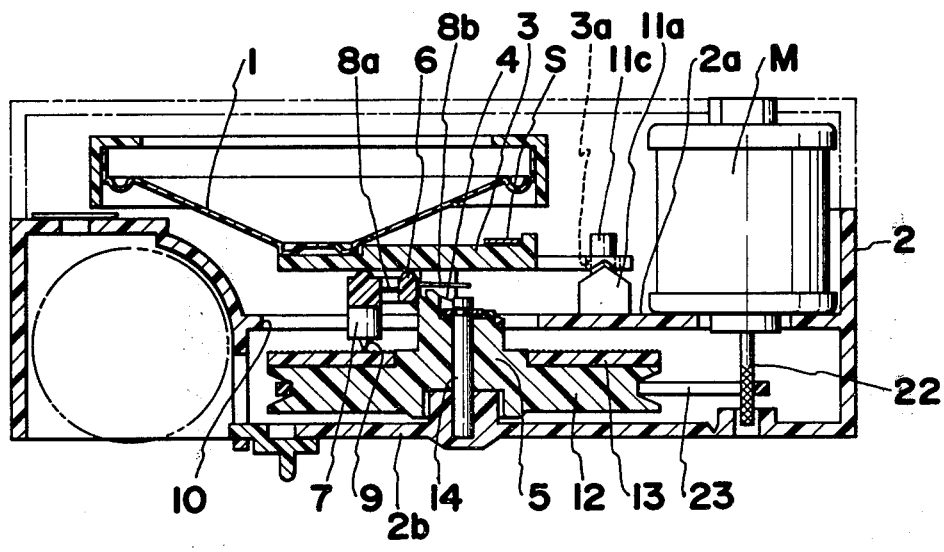
FIG. 2 is a sectional view taken along the line 2.3—2.3 of FIG. 1.

The tone arm 7 is pivotally secured at its one end to the mid plate 2a, and carries at the downward side of its other end the reproducing needle 9 as shown in FIG. 2. The pivotal support for the tone arm 7 is provided by a pin 15 extending upwardly from the middle plate 2a and received by a bore 16' formed in the end of the tone arm with a certain gap for affording the pivotal movement. Thus, the tone arm is supported for pivotal movement in two orthogonal directions, i.e., in the direction along the plane of the mid plate 2a and in the direction perpendicular to the plane of the mid plate 2a.

The end portion of the tone arm 7 carrying the reproducing needle 9 slidably abuts the lower side of the portion of the intermediate sound transmitting body 3 extending over the window 10. The tone arm 7 is biased by a first spring 16 toward the starting position of the reproduction. The spring 16 also exerts a slight force to move the tone arm away from the mid plate 2a. Numeral 19 denotes a stopper for limiting the movement of the tone arm 7.

A swingable rod 6 is provided with a bore 18 which has a diameter sufficiently large to loosely receive a pin 17 extending upwardly from the middle plate 2a, so that the swingable rod 6 is allowed a pivotal movement. The free portion of the swingable rod 6 occupies a position between the cam 4 and the tone arm 7, and is lightly pressed to the lower side of the intermediate sound transmitting body 3 for slidable contact with the latter. Thus, the swingable arm 6 is swingable in two orthogonal directions, i.e., in the directions along and perpendicular to the plane of the mid plate 2a.

The swingable rod 6 is biased by a second spring 8b to move along the plane of the mid plate 2a away from the cam 4. This movement is, however, limited by a stopper 20. The loose engagement of the pin 17 and the bore 18 allows the swingable rod 6 to be swung away from the mid plate 2a.

In the embodiment as shown in FIG. 1, the spring 8b for biasing the swingable rod is wound around and retained by a pin 21 formed on the rod 6 and is extended to a region between the tone arm 7 and the swingable rod 6, so as to constitute a resilient body 8a which functions as a buffer. This resilient body will be hereinafter referred to as a spring 8a.

Figure 4:
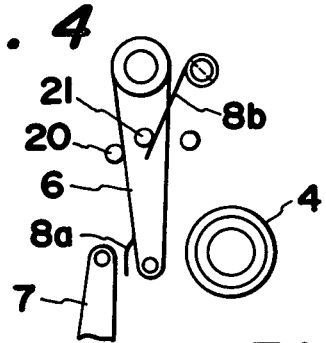
FIG. 4 is a partial plan view of another form of a buffer resilient member.
Figure 5A:
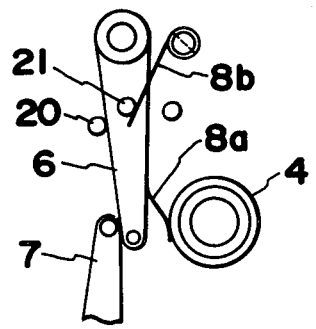
FIGS. 5A and 5B are partial plan views of different embodiments incorporating different forms of the buffer resilient member.

As shown in FIG. 4, this buffer spring 8a may be provided on the side of the swingable rod 6 confronting the tone arm 7, independently of the spring 8b for biasing the swingable rod 6. Alternatively, although not shown, the spring 8a may be provided on the side of the tone arm 7 confronting the swingable rod 6. Further, the spring 8a may be unitarily provided on the side of the swingable rod 6 facing the cam 4, so as to lift the swingable rod 6, as shown in FIG. 5A. In such a case, the spring 8a functions as a part of the swingable rod 6 which comes to ride on the cam 4, as will be seen from FIG. 5B.

Figure 3:
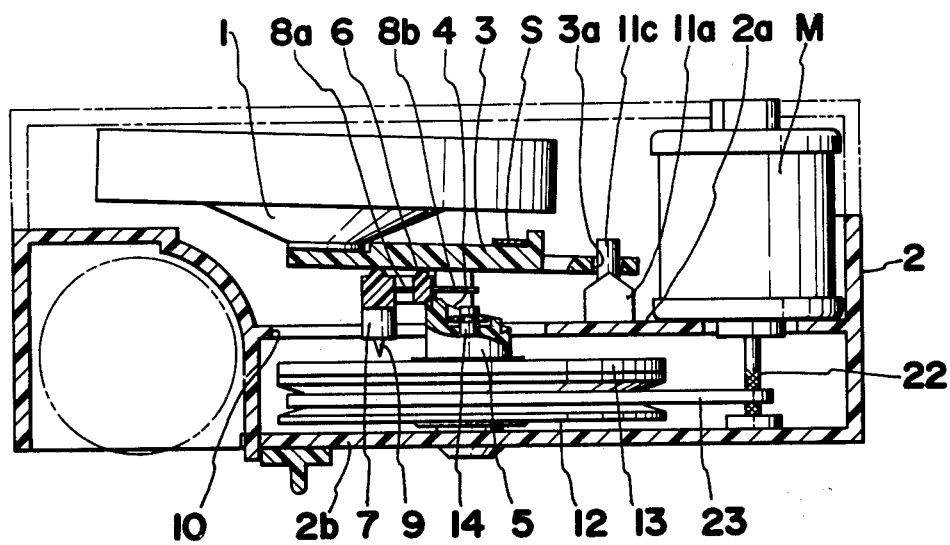
FIG. 3 is a side elevational sectional view taken partially along the line 2.3—2.3 of FIG. 1 and showing a cam acting on a swingable rod.

A motor M secured to the mid plate 2a has an output shaft 22 extended down through the mid plate 2a, as will be seen from FIGS. 2 and 3. A pulley for rotating aforementioned turntable 12 is operably connected to the output shaft 22 through a belt 23.

In operation, referring to FIGS. 2, 3, 5A and 5B the tone arm 7 is moved gradually toward the center of the record disc 13, i.e., toward the final position of the reproduction, as the reproduction goes on, as shown in FIG. 2. Meanwhile, the tone arm 7 is biased by the intermediate sound transmitting body 3 toward the record disc 13, so that the reproducing needle 9 is received by the record groove on the record disc 13. The reproduced sound is transmitted from the needle 9 to the speaker 1, through the tone arm 7.

When the reproduction is over and the tone arm has been moved to the final position of the reproduction, it presses the swingable rod 6 onto the side of the cam 4. If the swingable rod 6 is confronted by the higher side of the cam contour, it is kept stationary until the lower side of the cam contour approaches. The movement of the tone arm 7 during this waiting period is conveniently absorbed by the buffer spring 8a. As the cam 4 is rotated to bring the lower side of the cam contour to confront the swingable rod 6, the latter comes to ride on the cam contour due to the force exerted by the tone arm 7 and the resilient force exerted by the buffer spring 8a.

Figure 5B:
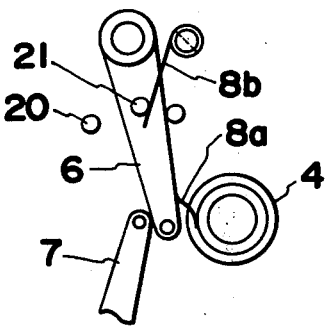

FIGS. 5A and 5B show the manner of operation of a modification in which the buffer spring 8a unitarily secured to the side of the swingable rod 6 facing the cam 4. In this modification, the spring 8a comes to ride on the cam contour of the cam 4, so as to unitarily lift up the swingable rod 6.

Referring now to FIG. 3, the swingable rod 6 of the embodiment of FIG. 2 comes to lift up the intermediate sound transmitting body 3, as it is lifted by the action of the cam 4. Consequently, the tone arm is freed and moved upwardly by the spring 16 (See FIG. 1) so as to disengage the reproducing needle 9 from the recording groove. Then, the spring 16 acts to bring the tone arm 7 back to the starting position of the reproduction. Meanwhile, the swingable rod 6 is also returned to the starting position by means of the spring 8b.

It will be seen from the foregoing description of the preferred embodiment that the troublesome work of selecting the phase of the cam for causing the returning of the tone arm 7 can be dispensed with, due to the simplified measure of providing a buffering spring 8a in relation with the swingable rod 6, tone arm 7 and the cam 4. This greatly facilitates operation of the phonograph, as well as production of the same.

What is claimed is:

1. A toy phonograph comprising:
   a housing including a base;
   a rotatable turntable with a record disc mounted on said base and including a center pin extending upwardly at the center of said turntable;
   an intermediate sound transmitting body supported at one end thereof above said record disc for movement toward and away from said record disc;
   a speaker;
   said sound transmitting body being adapted to make sound transmitting contact with said speaker;
   a cam disposed on the upper end of said center pin and being adapted to exert a force in the axial direction of said center pin;
   a tone arm pivotally secured at one end thereof to a portion of said housing;
   a first spring, said tone arm being normally biased by said first spring toward the starting position of a reproduction, adjacent the periphery of said turntable;
   the free end of said tone arm being adapted to slidably contact the lower side of said sound transmitting body when said tone arm travels between the starting position and a final position of the reproduction, said tone arm being biased toward said turntable by said sound transmitting body;
   a swingable rod supported on a portion of said housing and being adapted to be swung along a plane intersecting the axis of said cam;
   a second spring, said swingable rod being normally biased by said second spring in a direction away from said cam;
   said swingable rod being pivotally mounted to permit said rod to contact said cam when said rod is moved against the normal biasing force of said second spring, to thereby lift said intermediate sound transmitting body;
   said free end of said tone arm being adapted to press said swingable rod against the normal biasing force of said second spring into contact with said cam when said tone arm moves to the final position of the reproduction; and
   a buffer resilient body adapted to absorb relative movement between said swingable rod and said tone arm when said swingable rod is pressed into contact with said cam, said buffer resilient body comprising a portion of said second spring.

2. A toy phonograph in accordance with claim 1, wherein:
   said buffer resilient body comprises a portion of said second spring which is extended from the portion of said second spring acting on said swingable rod into a region between said tone arm and said swingable rod.

3. A toy phonograph in accordance with claim 2, wherein:
   a pin member is disposed on said swingable rod; and
   an intermediate portion of said second spring is wound around and retained by said pin member.

* * * * *